United States Patent

Burov et al.

[11] Patent Number: 6,153,965
[45] Date of Patent: *Nov. 28, 2000

[54] PIEZOELECTRIC STEP MOTOR

[75] Inventors: Sergey Vyacheslavovich Burov, Arkhangelsk; Jury Vladimirovich Okatov, Severodvinsk, both of Russian Federation

[73] Assignee: Samsung Electronics Co., Ltd., Rep. of Korea

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 09/011,397
[22] PCT Filed: Jun. 2, 1997
[86] PCT No.: PCT/RU97/00169
  § 371 Date: Feb. 20, 1998
  § 102(e) Date: Feb. 20, 1998
[87] PCT Pub. No.: WO97/47076
  PCT Pub. Date: Dec. 11, 1997

[30] Foreign Application Priority Data

Jun. 3, 1996 [RU] Russian Federation .............. 96111138

[51] Int. Cl.[7] .................................................. H01L 41/08
[52] U.S. Cl. ...................................... 310/328; 310/323.02
[58] Field of Search ...................................... 310/323, 328, 310/323.02

[56] References Cited

U.S. PATENT DOCUMENTS

| 5,043,621 | 8/1991 | Culp | 310/316 |
| 5,068,566 | 11/1991 | Culp | 310/328 |
| 5,136,201 | 8/1992 | Culp | 310/328 |
| 5,144,187 | 9/1992 | Culp | 310/328 |
| 5,182,484 | 1/1993 | Culp | 310/328 |
| 5,241,235 | 8/1993 | Culp | 310/328 |
| 5,273,238 | 12/1993 | Sato | 244/105 |

FOREIGN PATENT DOCUMENTS

| 0112454 | 10/1983 | European Pat. Off. . |
| 0360975 | 4/1990 | European Pat. Off. . |
| 60-002081 | 8/1985 | Japan . |
| 60-082072 | 10/1985 | Japan . |
| 573828 | 10/1977 | U.S.S.R. . |
| 738016 | 5/1980 | U.S.S.R. . |

*Primary Examiner*—Elvin Enad
*Assistant Examiner*—Peter Medley
*Attorney, Agent, or Firm*—Piper Marbury Rudnick & Wolfe

[57] ABSTRACT

A piezoelectric stepping motor comprising a cylindrical housing 1, a stator (2) and a rotor (3). The stator (2) comprises at least two rotary-fixing piezoelectric units (4, 5) arranged inside the housing (1) one after another in a longitudinal plane. Each piezoelectric unit (4, 5) comprises a rotary piezoelectric cell (6) a fixing piezoelectric cell (7), insulators (8) and a friction member (9).

8 Claims, 2 Drawing Sheets

PIEZOELECTRIC STEP MOTOR

FIELD OF THE INVENTION

The present invention relates to the field of electric motors and more specifically relates to piezoelectric stepping motors.

BACKGROUND OF THE INVENTION

Known in the art is a piezoelectric stepping motor comprising a power supply unit, a rotor, a stator, propulsive bimorph piezoelectric cells and fixing elements (SU, A, 769665).

However, in this piezoelectric stepping motor the bimorph piezoelectric cell has insignificant contact with the rotor that results in nonuniform steps of the angular displacement of the rotor.

Also known in the art is a piezoelectric motor which stator comprises a cylindrical hollow cylinder having inside a cylindrical rotor frictionally interacting with the stator (SU, A, 573828).

However, this piezoelectric motor operates through the shifting and radial oscillations of the rotor and stator and their frictional interaction, in which case it is impossible to provide uniform angular displacement of the rotor and its accurate positioning.

SUMMARY OF THE INVENTION

The basic object of the present invention is to create a piezoelectric stepping motor which constructive embodiment would allow to simplify the design and manufacturing technology, to obtain a high torque at small dimensions and mass of the motor while providing a uniform rotation of the rotor and its motion in the reverse direction.

This object is achieved by providing a piezoelectric stepping motor comprising a housing, a stator in the form of a cylindrical piezoelectric hollow cylinder having inside a cylindrical rotor frictionally interacting with the stator, in which motor, according to the invention, the stator comprises at least two rotary-fixing piezoelectric units, which are arranged inside the housing, one after another in the longitudinal plane each piezoelectric unit comprising a rotary and a fixing piezoelectric cells, insulators and a friction element.

The piezoelectric units may be made in the form of sectors.

The gaps between the piezoelectric units are preferably filled with an elastic insulating material.

The piezoelectric cells may be made in the form of a set of piezoelectric rings and their sectors which electrodes are connected in parallel alternately, in which case the direction of polarization of each successive piezoelectric ring or sector is opposite to that of the previous one.

The rotor may have at least one guide which enters the corresponding guide on the friction elements.

Such constructive embodiment of the stepping motor, according to the invention, would allow to simplify the design and the manufacturing technology, to obtain a high torque at small dimensions and mass of the motor while a providing uniform rotation of the rotor and its motion in the reverse direction.

BRIEF DESCRIPTION OF THE DRAWINGS

The invention is further described by way of example with reference to the accompanying drawings, in which.

THE BEST EMBODIMENTS OF THE INVENTION

Figure 1:
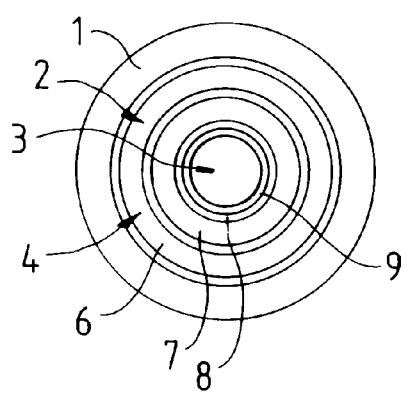
FIG. 1 is a front view of the piezoelectric stepping motor according to the invention.
Figure 2:
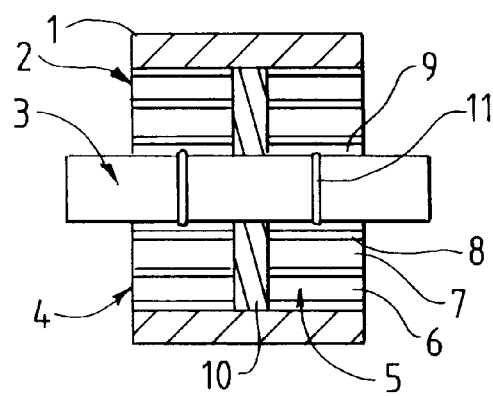
FIG. 2 is a longitudinal section of the motor of FIG. 1.

The piezoelectric stepping motor, according to the invention, comprises a cylindrical housing 1 (FIG. 1), a stator 2 and a rotor 3 in the form of a cylindrical rod. The stator 2 (FIG. 2) is made in the form of two rotary-fixing piezoelectric units 4 and 5. Each piezoelectric unit 4 and 5 consists of a piezoelectric cell 6, a fixing piezoelectric cell 7, insulators 8 and a friction element 9 connected to each other. The rotary piezoelectric cells 6 have a polarization vector extending at an angle to the longitudinal plane of the motor. The fixing piezoelectric cells 7 have a radial polarization vector. The friction element 9 is made in the form of a split ring that can tighter squeeze the rotor 3.

The gaps between the rotary-fixing piezoelectric units 4 and 5 are filled with an elastic insulating material 10. The rotor 3 is provided with guides 11 in the form of a projection to exclude the axial shift of the rotor. These guides 11 enter the corresponding guides in the friction elements 9.

Each piezoelectric cell 6 and 7 has electrodes, to which wires are connected (not shown in the drawings).

Figure 3:
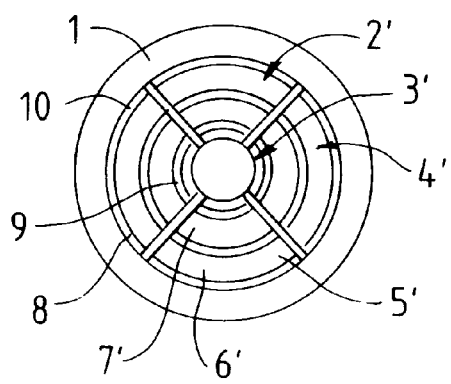
FIG. 3 is a front view of another embodiment of the motor.
Figure 4:
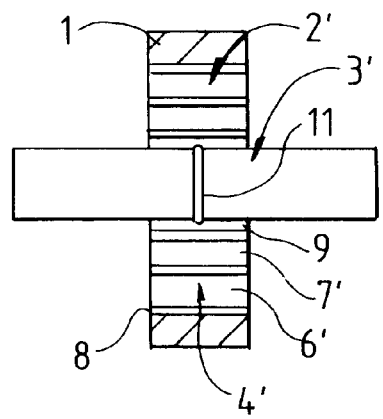
FIG. 4 is a longitudinal section of the motor shown in FIG. 3.

In another embodiment of the claimed motor, where characters 2'–2' represent parts analogous to those represented by characters 2–7, respectively, of the first embodiment, rotary-fixing piezoelectric units 4 (FIGS. 3 and 4) and 5' are arranged in one transverse plane and made in the form of sectors. This considerably reduces the dimensions and mass of the motor, The claimed motor using the first embodiment by example operates as shown in FIGS. 5–10.

When a positive voltage is applied to the electrodes of the piezoelectric cell 6, the inverse piezoelectric effect results in a shift of the inner part of the ring through an angle $\alpha$ counterclockwise with respect to the diametral line $A_1A_2$, in which case the point B located on the inner part of the ring is displaced along the arc through the angle $\alpha$ counterclockwise.

When a negative voltage is applied to the electrodes of the rotary piezoelectric cells 6 the inner part of the ring is shifted clockwise through an angle $\alpha$ with respect to the diametral line $A_1A_2$, in which case the point B located on the inner part of the ring is displaced through an angle $\alpha$ clockwise.

On applying a positive voltage to the fixing piezoelectric cells 7 the rotor 3 is squeezed, while when applying a negative voltage the piezoelectric cells are pushed apart from the rotor 3.

Figure 5:
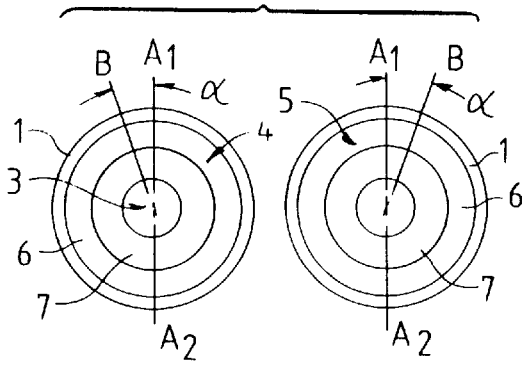
FIG. 5 is the first time step of the operation of the piezoelectric stepping motor, two cross-sectional views of the first and second rotary-fixing units.
Figure 6:
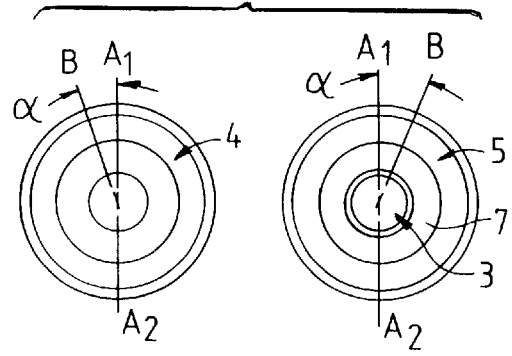
FIGS. 6–10 are other time steps of the operation of the piezoelectric step motor.
Figure 7:
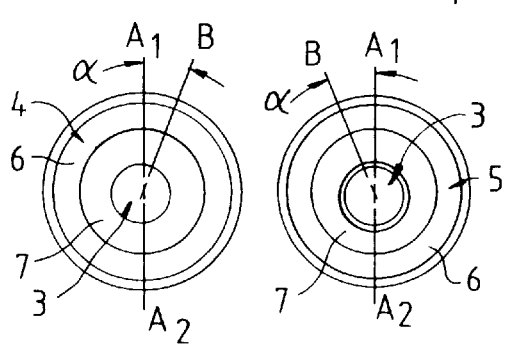
Figure 8:
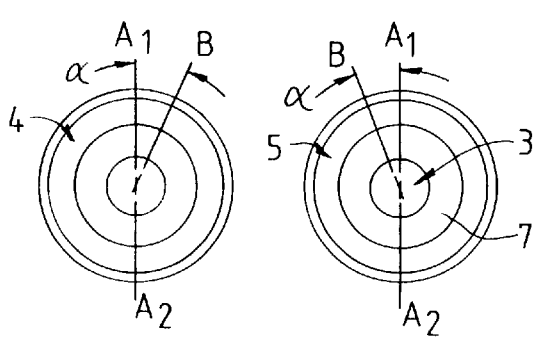
Figure 9:
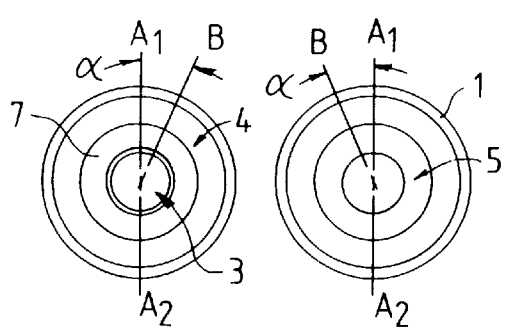
Figure 10:
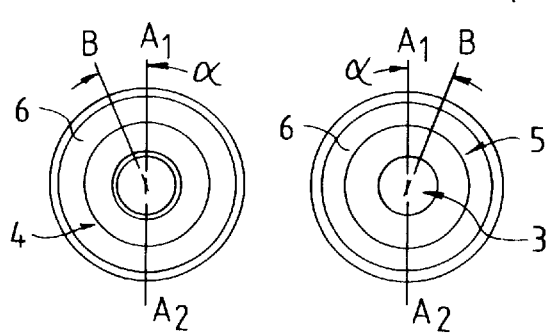

The working cycle consists of six time steps. The position corresponding to the first time step is shown in FIG. 5. The positive voltage is applied to the piezoelectric cells of the piezoelectric unit 4, the piezoelectric cell 6 displacing the fixing piezoelectric cell 7 through an angle $\alpha$ counterclockwise and the fixing piezoelectric cell 7 squeezing the rotor 3. The piezoelectric cells 6 of the piezoelectric unit 5 is fed with a negative voltage, while the fixing piezoelectric cell 7 of the piezoelectric unit 5 is fed with a positive voltage, the rotary piezoelectric cells 6 displacing the fixing piezoelectric cell 7 through an angle a counterclockwise and the fixing piezoelectric cell 7 squeezing the rotor 3.

In the second time step the fixing piezoelectric cell 7 (FIG. 6) of the piezoelectric unit 5 is fed with negative voltage so that it is pushed apart from the rotor.

In the third time step the negative voltage is applied to the rotary piezoelectric cell 6 (FIG. 7) of the piezoelectric unit 4 which turns both the fixing piezoelectric cell 7 and the rotor 3 through an angle 2α clockwise. In this case, a positive voltage is applied to the rotary piezoelectric cell 6 of the piezoelectric unit 5, and the fixing piezoelectric cell 7 is turned through an angle 2α counterclockwise.

In the fourth time step the positive voltage is applied to the fixing piezoelectric cell 7 (FIG. 8) of the piezoelectric unit 5, and the rotor 3 is squeezed.

In the fifth time step the negative voltage is applied to the fixing piezoelectric cell 7 (FIG. 9), and it is pushed apart from the rotor 3.

In the sixth time step the positive voltage is applied to the rotary piezoelectric cell 6 (FIG. 10) of the piezoelectric unit 4 thereby displacing it through an angle 2α counterclockwise. The negative voltage is applied to the rotary piezoelectric cell 6 of the piezoelectric unit 5, and it turns the rotor 3 through an angle 2α clockwise.

For one working cycle the rotor 3 is turned through an angle 4α. Then these cycles are repeated, in which case the rotor 3 rotates clockwise. For reversing it is necessary to change the sequence in applying the voltage to the fixing piezoelectric cells 7.

To increase the power output the stepping motor may be provided with additional piezoelectric units.

The piezoelectric stepping motor, according to the invention, ensures a high torque on the rotor, a uniform rotation, an exact positioning and a reversing.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

INDUSTRIAL APPLICABILITY

The invention can be used as a slave mechanism in electrical engineering, telemechanics, radio engineering and automation.

What is claimed is:

1. A piezoelectric stepping motor comprising:

a) a housing having an inner surface;

b) at least two cylindrical, hollow rotary-fixing piezoelectric units attached to the inner surface of the housing, each of the rotary-fixing piezoelectric units being in separate transverse planes, each rotary-fixing piezoelectric unit having a cylindrical rotary piezoelectric cell, a cylindrical fixing piezoelectric cell attached to the rotary piezoelectric cell, and a friction member attached to the fixing piezoelectric cell; and c) a rotor, which frictionally interacts with at least one friction member, the rotary and fixing piezoelectric cells of each rotary-fixing piezoelectric unit being configured to operate sequentially in order to rotate the rotor.

2. A piezoelectric stepping motor, comprising:

a) a housing having an inner surface;

b) at least two coplanar sets of rotary-fixing piezoelectric sectors attached to the inner surface of the housing, each rotary-fixing piezoelectric sector having a rotary piezoelectric cell, a fixing piezoelectric cell, and a friction member attached to the fixing piezoelectric cell; and c) a rotor, which frictionally interacts with at least one friction member, the rotary and fixing piezoelectric cells of each rotary-fixing piezoelectric sector being configured to operate sequentially in order to rotate the rotor.

3. The motor of claim 2, wherein the fixing piezoelectric cells are disposed in the rotary-fixing piezoelectric sectors between the rotary piezoelectric cells and the rotor.

4. The motor of claim 3, further comprising an insulating material disposed between and separating the rotary-fixing piezoelectric sectors.

5. The motor of claim 3, wherein the rotary piezoelectric cells have an inner surface and a rotational vector of polarization such that the inner surfaces of the rotary piezoelectric cells shift angularly when voltage is applied to the rotary piezoelectric cells.

6. The motor of claim 3, wherein the rotor has at least one guide, and wherein at least one friction member has a guide configured to frictionally interact with one of the rotor guides.

7. In a piezoelectric stepping motor having a longitudinal axis, a rotor, and first and second sets of rotary-fixing piezoelectric sectors, a method of rotating the rotor in a single angular direction, comprising the steps of:

a) frictionally engaging the rotor with the first and second sets of piezoelectric sectors;

b) releasing the rotor with the second set of piezoelectric sectors, while the first set of piezoelectric sectors remains frictionally engaged to the rotor;

c) angularly shifting the first set of piezoelectric sectors in the single angular direction while angularly shifting the second set of piezoelectric sectors in an angular direction opposite to the single angular direction, thereby rotating the rotor in the single angular direction;

d) frictionally engaging the rotor with the second set of piezoelectric sectors;

e) releasing the rotor with the first set of piezoelectric sectors, while the second set of piezoelectric sectors remains frictionally engaged to the rotor; and f) angularly shifting the second set of piezoelectric sectors in the single angular direction while angularly shifting the first set of piezoelectric sectors in an angular direction opposite to the single angular direction, thereby rotating the rotor in the single angular direction; and g) repeating steps a) through f) to rotate the rotor in the single angular direction.

8. In a piezoelectric stepping motor having a longitudinal axis, a rotor, and first and second cylindrical piezoelectric units, each cylindrical piezoelectric unit having a cylindrical piezoelectric rotary cell and a cylindrical piezoelectric fixing cell, a method of rotating the rotor in a single angular direction, comprising the steps of:

a) frictionally engaging the rotor with the first and second piezoelectric units;

b) releasing the rotor with the second piezoelectric unit, while the first piezoelectric unit remains frictionally engaged to the rotor;

c) angularly shifting the first piezoelectric unit in the single angular direction while angularly shifting the second set of piezoelectric sectors in an angular direction opposite to the single angular direction, thereby rotating the rotor in the single angular direction;

d) frictionally engaging the rotor with the second piezoelectric unit;

e) releasing the rotor with the first piezoelectric unit, while the second piezoelectric unit remains frictionally engaged to the rotor;

f) angularly shifting the second piezoelectric unit in the single angular direction while shifting the first piezoelectric unit in an angular direction opposite to the single angular direction, thereby rotating the rotor in the single angular direction; and g) repeating steps a) through f) to rotate the rotor in the single angular direction.

* * * * *